Jan. 26, 1937.                     C. O. PATTEN                     2,068,888
                                STANCHION ASSEMBLY
                                 Filed Feb. 6, 1935

INVENTOR,
CLARENCE O. PATTEN.
BY
Lippincott & Metcalf
his ATTORNEYS.

Patented Jan. 26, 1937

2,068,888

UNITED STATES PATENT OFFICE 2,068,888

STANCHION ASSEMBLY

Clarence O. Patten, Keyes, Calif., assignor of one-half to Verne K. Horton, Modesto, Calif.

Application February 6, 1935, Serial No. 5,228

3 Claims. (Cl. 119—27)

My invention relates to the dairy industry, and more particularly, to a means facilitating the efficient milking of cows in what is known as a walk-through milking shed, and also has particular reference to the type of stanchion used for holding the animals during milking.

Among the objects of my invention are: To provide a walk-through milking shed where the milker does not need to change position in order to milk a plurality of cows or other milk giving animals; to provide a combined releasable stanchion and feed trough; to provide a stanchion which can be operated to release an animal after being milked, without changing position of the milker; to provide a releasable stanchion easily manufactured from pipe fitting and strap material; to provide a combination releasable stanchion and feed trough wherein the feed trough may be dumped and the animal to be milked released simultaneously; and to provide a simple and easily operated feeding stanchion adapted for use in a walk-through milking shed.

Other objects of my invention will be apparent or will be specifically pointed out in the description forming a part of this specification, but I do not limit myself to the embodiment of the invention herein described, as various forms may be adopted within the scope of the claims.

Modern dairy supervision has required that milch animals, such as cows and goats, for example, shall be milked under conditions of maximum cleanliness in order that the bacterial content of the milk be as low as possible. These requirements have led to the adoption of a number of different milking methods, one of which is the use of the milking machine, and another, that with which this present application deals, the use of a walk-through milk shed wherein the milkers do not move, but the cows or other animals come to the milker, are positioned before the milker for a short time while they are being milked and then passed on through the milking position to the barns or storage or feed corral.

Figure 1:
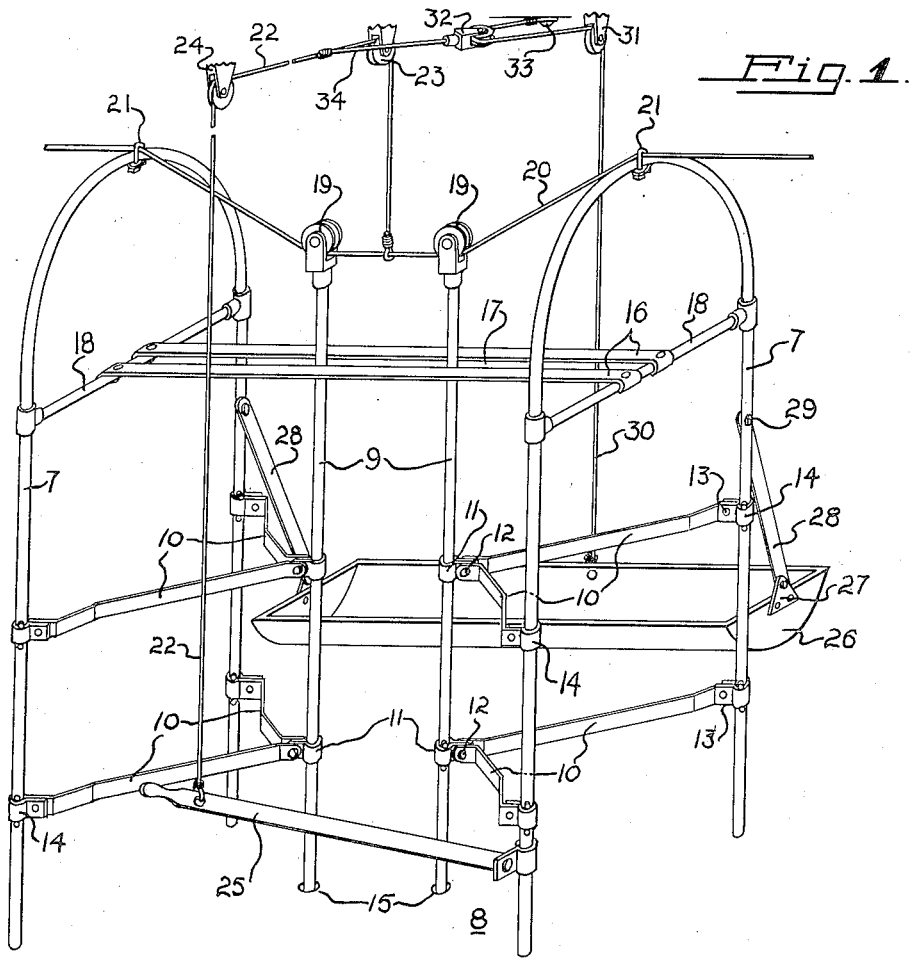

In the drawing, Figure 1 is a perspective view of a preferred form of stanchion.

Figure 2:
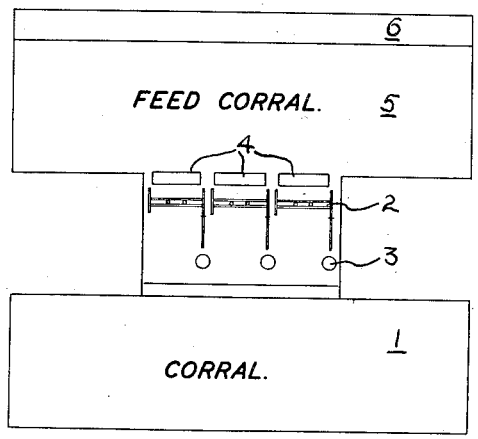

Figure 2 is a diagrammatic drawing representing a walk-through milking shed.

In order that the operation of a walk-through shed be more fully understood, I have appended hereto a schematic diagram showing an idealized set up. Referring directly to Figure 2, the cows or other milch animals are brought off the feed lots or pasture and stored in a corral 1. The usual practice is not to feed the cows in this corral, but to wait until during or after milking. As they are usually fed while being milked, they soon become accustomed to entering by themselves a series of one or more stanchions 2. While they are in the stanchions 2, milkers sitting in positions as indicated by the circles 3, milk the animals and they may at the same time be fed grain or other concentrated rations from the feed trough assemblies 4. After they have been milked, the stanchion assemblies 2 are opened and feed trough assemblies 4 removed from in front of the animals and the animals pass into a feed corral 5 where they may be further fed in a general feed trough 6.

When animals are milked in this manner, they soon learn to take their places and wait in line for positions in the milking stalls in order that they may pass through them into the feed corral, and there is, therefore, a continuous procession of the animals past the milking positions. Under these circumstances, milking is fast, the milker is not required to move, and usually auxiliary help is given to the milkers so that full pails of milk are carried away at once and new pails provided.

There is usually a cooling shed closely associated with the milking shed so that the milk may be immediately cooled without being carried long distances. This particular type of walk-through milk shed also greatly facilitates the production of low count milk, as the shed, being of relatively small extent as compared to a barn, where all the animals are stationed at one time, may be easily kept clean. It is usually of tile or cement finish so that it may be readily hosed.

My invention has particular reference to a type of stanchion adapted for use in the type of shed above described, wherein the animal within the stanchion may be locked in the stanchion and released by the milker without moving from his milking position, and where, if desired, the animal can be fed during milking without causing obstruction to subsequent forward release, and without the necessity of the removal of the feed troughs by additional workmen.

My invention may be understood more fully by reference particularly to Figure 1, which shows the preferred form of my stanchion as built for use directly with a walk-through milking shed and corral arrangement such as shown in Figure 2.

The foundation members of my preferred stanchion are a pair of opposed and parallel U-frames 7, preferably formed from pipe and pipe fittings. It is of course understood that these U-frames may be in other shapes and of other materials without departing from the spirit of the invention. The open ends of these frames are solidly set into cement 8 of the shed floor and when thus anchored are used to support a pair of stanchion bars 9 which are positioned between the two U-frames and spaced in upright position such a distance apart that they may hold an animal to be milked between the head and shoulders, as is customary with stanchions in general. The stanchion bars 9 are fastened, preferably in two places, to pairs of stanchion support bars 10 disposed at different levels. These bars at the stanchion bar end are hinged to a stanchion bar clip 11 by means of a stanchion bar bolt 12, the support bars then diverging to approach each leg of the nearest U-frame. Here each support bar 10 is hinged to the frame by a frame bolt 13 passing through the end of the support bar and frame clips 14. Thus, each stanchion bar 9 is hingeably positioned in upright position and preferably has its lower end positioned in sockets 15 in the floor 8, thus anchoring the lower end of the bars against pressure exerted by the animal. This latter feature is purely optional, and it need not be used in cases where the support bars 10 and the remainder of the frame are of sufficient strength to restrain the animal.

The upper ends of the stanchion bars are stayed against forward and backward motion exerted by the animal by a pair of pressure straps 16 having a slot 17 between them through which the stanchion bars pass, these straps being supported on frame cross arms 18. Thus, I have provided both an upper and lower thrust means to take the surge of the animal when imprisoned.

Inasmuch as both stanchion bars 9 are hingeably supported by the frames 7, they may be raised by an upward pull. I have provided for the application of this pull by placing on the upper end of each of the stanchion bars a pulley 19 through which an operating cable 20 runs, this cable being fixed to the top of each U-frame by a clamp 21. The cable may be continuous and be used for the same purpose through a number of stanchions. A release cable 22 passes through a release pulley 23 positioned immediately above the center of the portion of the operating cable between the two stanchion pulleys 19, passes through other pulleys, as exemplified by pulley 24 to a point over the milker from whence it drops down and is attached to an operating handle 25 positioned within reach of the milker. A pull on release cable 22 will, through the medium of operating cable 20 and pulleys 19, raise the stanchion bars, and as they rise, they will also move laterally and approach the U-frames, thus widening the gap between the two stanchion bars sufficiently to release the animal and allow it to pass on through into the feed corral. When the next animal to be milked takes its position in the shed in the proper milking position, the handle 25 is released and the stanchion bars drop by their own weight into the restraining position shown in Figure 1, thus imprisoning the new animal.

This is the operation and structure of the stanchion as used in many cases without any feeding means whereby the animal may be fed during milking.

I prefer, however, to provide additional means whereby a feed trough may be positioned in front of the animal during the milking operation, this feed trough being simultaneously removable from the path of the animal with the opening of the stanchion to release the animal. A feed trough 26, preferably formed as a portion of a cylinder or similar shape to hold feed such as small grain or chopped feed of any sort, is positioned across the front of the stanchion and extends as far as the animal can reach on each side. Both ends of the trough are provided with a hinge block 27 to which is hinged a trough bar 28. The other end of each trough bar is also hinged to the adjacent legs of the U-frames by bolts 29. The trough is so constructed that by its own weight it will hang in a feed holding position. The feed trough in the feeding position as described and shown, will of course block the exit of the stanchion, and I have, therefore, provided means to raise the feed trough out of blocking position when the stanchion is opened. This I do by fastening to the outer edge of the trough a trough cable 30 which passes over a trough pulley 31 through an idler pulley 32 and is then fixed to the ceiling or other portion of the shed by a pin 33. The idler pulley 32 is connected by a short piece of cable 34 to the release cable 22 at any convenient point. Thus, when the handle 25 is pushed down, the stanchion bars are raised and spread due to the direct application of the pull by release cable 22 on operating cable 20, and simultaneously the trough 26 is raised by being rotated around the arc as determined by the trough bars 28, by cable 30. At the same time, due to the fact that the cable 30 is applied to the outside edge of the trough, the trough is rotated on its axis and dumps what is left of the feed therein. In this way, the release of the animal is unimpeded by the trough and at the same time, following animals are not required to eat the remainder of the feed left by another animal, thus reducing the danger of transmission of diseases between animals. An automatic feed loading device may be used for filling the troughs, this feature, however, being no part of my present invention.

It will thus be seen that my stanchion provides for the retention and release of dairy animals during milking by the milker without leaving his position, for the feeding of the animal in a walk-through stanchion, and for the removal of the feed trough simultaneously with the release of the animal so that the animal may pass through and leave the stanchion in the opposite direction to that which it entered.

I claim:

1. An article of the class described comprising a pair of upright stanchion bars spaced to hold an animal by the head, supports hinged to each of said bars extending laterally and hinged to opposite foundation structures, a bar cable fixed to each of said foundation structures and passing through pulleys on the upper ends of said bars, and an operating cable attached to said bar cable between said bars whereby an upward pull on said operating cable will simultaneously raise and spread said bars to release said animal.

2. An article of the class described comprising a pair of spaced and parallel U-frames having their free ends anchored at ground level, a pair of stanchion bars spaced to hold an animal by the head positioned between said frames, a plurality of pairs of stanchion support bars extending from said stanchion bars to said U-frames, each pair being hinged at one end to a stanchion bar and at the other to opposite legs of the same U-frame, a pulley adjacent the top of each stanchion bar, a bar cable attached to the top of each of said U-frames and passing through said pulleys, and an operating cable attached to said bar cable between said stanchion bars.

3. In combination with a walk-through stanchion assembly, a feed trough hinged to said assembly and barring the exit from said assembly, and a single operating means for simultaneously releasing an animal in said assembly, turning said trough to dumping position, and thereafter raising said trough to clear said exit.

CLARENCE O. PATTEN.